United States Patent [19]
Niki et al.

[11] Patent Number: 5,191,057
[45] Date of Patent: Mar. 2, 1993

[54] POLYESTER AND AN ARTICLE MADE OF THE SAME COMPRISING A P-QUATERPHENYL DERIVATIVE

[75] Inventors: Akihiro Niki, Takatsuki; Makoto Ohsuga, Sakai; Toshio Uesaka, Tokuyama; Toranosuke Saito; Hiroki Tsunomachi, both of Ibaraki; Kazuo Doyama, Suita; Makoto Yamaguchi, Takatsuki; Daishiro Kishimoto, Ibaraki, all of Japan

[73] Assignees: Sekisui Kagaku Kogyo Kabushiki Kaisha; Kabushiki Kaisha Sanko Kaihatsu Kagaku Kenkyusho, both of Osaka, Japan

[21] Appl. No.: 804,540

[22] Filed: Dec. 11, 1991

Related U.S. Application Data

[63] Continuation of Ser. No. 438,142, Nov. 20, 1989, abandoned, which is a continuation-in-part of Ser. No. 356,726, May 25, 1989, abandoned.

[30] Foreign Application Priority Data

| May 26, 1988 | [JP] | Japan | 63-129181 |
| May 26, 1988 | [JP] | Japan | 63-129182 |
| Aug. 31, 1988 | [JP] | Japan | 63-216874 |
| Aug. 31, 1988 | [JP] | Japan | 63-216876 |
| Jan. 24, 1989 | [JP] | Japan | 1-15748 |
| Jan. 24, 1989 | [JP] | Japan | 1-15845 |

[51] Int. Cl.$^5$ ............ C08G 63/00; C08G 77/00; C08G 77/04; C08G 8/02
[52] U.S. Cl. ............ 528/190; 528/10; 528/26; 528/33; 528/125; 528/128; 528/176; 528/195; 528/206; 528/302
[58] Field of Search ............ 528/10, 26, 33, 125, 528/128, 176, 190, 195, 206, 302

[56] References Cited

U.S. PATENT DOCUMENTS 4,547,553 10/1985 Lubowitz et al. ............ 528/195

*Primary Examiner*—John Kight, III
*Assistant Examiner*—T. Mosley
*Attorney, Agent, or Firm*—Nikaido, Marmelstein, Murray & Oram

[57] ABSTRACT

A polyester is provided that comprises as main monomer components thereof a dicarboxylic acid and a diol, including a p-quaterphenyl derivative of specific formula. The use of appropriate kinds of dicarboxylic acid for the polyester makes it possible to obtain a thermoplastic elastomer or an engineering plastic material (i.e., liquid-crystal polymer).

23 Claims, 1 Drawing Sheet

POLYESTER AND AN ARTICLE MADE OF THE SAME COMPRISING A P-QUATERPHENYL DERIVATIVE

This application is a continuation of application Ser. No. 438,142 filed Nov. 20, 1989, now abandoned, which is a continuation in part of application Ser. No. 07/356,726 filed May 25, 1989, now abandoned in favor hereof.

BACKGROUND OF THE INVENTION

1. Field of the Invention

This invention relates to a polyester that is suitable for use as a material in the manufacture of articles such as a variety of parts for industrial use, film, sheets, and the like, and as a material for fibers, paints, adhesives, and the like. This invention also relates to articles that are made of this polyester.

More particularly, this invention relates to a polyester that can be used as a thermoplastic elastomer or as a liquid-crystal polymer for a variety of articles.

2. Description of the Prior Art

In general, if articles made of a composition that contains polymers are to have rubber-like elasticity, it is necessary for the polymer to be cross-linked at some locations in its molecule. For example, in rubber with elasticity, chains of rubber molecules are chemically cross-linked with sulfur molecules, thereby forming a network structure. Also, a number of compositions have been proposed that are combinations of a variety of thermoplastic polymers with a cross-linking agent. The composition undergoes a cross-linking reaction while the article is being formed from the composition. After the cross-linking reaction, the cross-linked composition is not thermoplastic any more, so it is not possible to mold the cross-linked composition by injection molding or by extrusion molding.

In recent years, thermoplastic elastomers have been developed that have rubber-like elasticity at ordinary temperatures and that are also plastic at high temperatures, and a variety of such thermoplastic elastomers are commercially available. For these thermoplastic elastomers, a long cross-linking process like that needed for rubber is unnecessary, and it is possible to form articles by injection molding or extrusion molding. The thermoplastic elastomers consist of soft segments and hard segments. The chemical structures of the soft segments and hard segments are different. In a mixture that contains both, regions that have similar properties collect together, and regions that have different properties mutually repel each other, resulting in an nonhomogeneous microscopic structure. The collected regions of the hard segments mentioned above act as physical cross-linkings between the polymer molecules. The physical cross-linkings arise only at ordinary temperatures or less, and thus, they are different from chemical cross-linkings.

The thermoplastic elastomers include, for example, polystyrene elastomers, polyolefin elastomers, polyurethane elastomers, polyester elastomers, polyamide elastomers, and other elastomers. In polystyrene elastomers, polystyrene segments correspond to hard segments, and form cross-linking domains. In other words, because the polystyrene segments bind polymer chains together, the polystyrene elastomers have elasticity. The hard segments of polyolefin elastomers are the crystalline phase of the polypropylene segments. In polyurethane elastomers, the polymer chains are cross-linked physically by hydrogen bonding of the polyurethane segments. In polyester elastomers, the polybutylene terephthalate segments act as the hard segments, and in amide elastomers, the nylon segments such as segments of nylon 6 or nylon 6,6 act as the hard segments.

As mentioned above, thermoplastic elastomers have rubber-like elasticity at ordinary temperatures, and are readily molded because chemical cross-linkings are not present. Thus, these materials are used in automotive parts and in a wide variety of other industrial products. However, because the cross-linking in conventional thermoplastic elastomers is achieved via physical binding, unlike the cross-linking in rubber, the heat stability is poor, as are the creep properties. Of all thermoplastic elastomers, the elastomer with the greatest heat stability is PELPREN ® S-9001 available from Toyobo Co., Ltd. However, the melting point of this elastomer is at most 223° C., and the heat deflection temperature (HDT) is 146° C. The HDT is measured by method B of JIS K7207 (JIS K7207 corresponds to ASTM D648) for the deflection temperature under a load. The Vicat softening point A of polyurethane elastomers is at most 140° C.

To raise the heat stability of conventional thermoplastic elastomers, it is necessary to increase the proportion of hard segments. However, if this is done, the hardness of the product at room temperature or lower temperatures is inevitably increased. Therefore, such elastomers are not suitable for products that should have elasticity over a wide range of temperatures, such as tubes, hoses, belts, packing, electrical wires, sporting goods, automotive parts, and the like.

In general, aromatic polyesters are obtained by the poly-condensation of the diols, dicarboxylic acids, and hydroxycarboxylic acids such as are shown in Table 1.

TABLE 1

| | Monomer components | | | Heat deflection temperature (°C.) | Tensile strength (kg/fcm$^2$) | Elongation at rupture (%) |
|---|---|---|---|---|---|---|
| | Diol | Dicarboxylic acid | Hydroxycarboxylic acid | | | |
| 1. Polyethylene terephthalate | Ethylene glycol | Terephthalic acid | — | | | |
| 2. Polybutylene terephthalate | Butanediol | Terephthalic acid | — | 58 | 540 | 360 |
| 3. Polycarbonate | Bisphenol A | Phosgene | — | 138 | 630 | 110 |
| 4. Polyarylate | Bisphenol A | Terephthalic acid and isophthalic acid | — | 164 | 715 | 60 |
| 5. Liquid-crystal polymer | Ethylene glycol | Terephthalic acid | p-Hydroxybenzoic acid | 64 | 1200 | 5 |

TABLE 1-continued

| | Monomer components | | | Heat deflection temperature (°C.) | Tensile strength (kg/fcm$^2$) | Elongation at rupture (%) |
| --- | --- | --- | --- | --- | --- | --- |
| | Diol | Dicarboxylic acid | Hydroxycarboxylic acid | | | |
| 6. Liquid-crystal polymer | — | — | p-Hydroxybenzoic acid and 2-hydroxy-6-naphthalenec carboxylic acid | 180 | 2100 | 3 |
| 7. Liquid-crystal polymer | 4,4'-Dihydroxy-biphenyl | Terephthalic acid | p-Hydroxybenzoic acid | 293 | 1200 | 6 |

The HDT of the aromatic polyesters numbered 1 to 4 in Table 1 is less than 180° C., so that the polyesters cannot be used, for example, as materials for surface-mounting electronic parts, and the like, which require high heat stability.

Polyesters that contain hydroxycarboxylic acid in the backbone chain of the aromatic polyester, such as the compounds numbered 5 to 7 in Table 1, are known as liquid-crystal polymers. Because hydroxycarboxylic acid is incorporated into the molecule, these polymers have liquid-crystal properties (i.e. mesomorphism). For that reason, when these liquid-crystal polymers are melted, their flowability is greater than that of ordinary polymers. In this way, liquid-crystal polymers have excellent moldability, and comparatively good heat stability. A polycondensate made of parahydroxybenzoic acid and 2-hydroxy-6-naphthalanecarboxylic acid is commercially available as the liquid-crystal polymer Vectra ® (Celanese Chemical Co.). This polycondensate has liquid-crystal properties based on hydroxycarboxylic acid, so it has greater melting flowability than ordinary polymers. For that reason, its moldability is good when being molded by injection molding or the like (Japanese Patent Publication No. 57-24407).

However, as shown in Table 1, the heat stability of polyesters 5 and 6 is not satisfactory. The HDT of polyester 7, 293° C., shows that its heat stability is satisfactory, but when this polyester is to be molded by, for example, injection molding, it is necessary to keep the cylinder temperature at 360° C. or more, so its moldability is poor.

As methods for the lowering of the melt viscosity of polyesters, the molecular weight of the compound can be decreased, or it might be possible to add plasticizer or a processing aid. With the first method, mechanical properties such as tensile strength and impact resistance decline, and the heat stability of the product is so much decreased as to make it unusable. With the second method, the disadvantage is that the product obtained has decreased heat stability.

In general, the following methods have been proposed for the raising of the heat stability of aromatic polyesters.

1. The blending of reinforcing fibers such as glass fibers or the like in the aromatic polyester.

2. The raising of the molecular weight of the polyester, or the increase of the cross-linking density of the polyester.

However, with method 1, the moldability is decreased, and the surface of the molded product is rough. If a composition that contains glass fibers in the above-mentioned aromatic polyester is used for the molding of products that are light, weighing about 10 mg to 10 g, that have thin parts, 1 mm or less thick, or that have sharp corners on the tip such as gears, the proportion of glass fibers in the thin parts or the sharp corners is less than that in the body of the product, because the fluiability of the glass fibers therein is poor. The result is that a satisfactory reinforcing effect arising from the glass fibers is not attained in the thin parts or the sharp corners. In addition, anisotropy and warping occur based on the orientation of the glass fibers, and it is not possible to achieve accurate molding.

With method 2, because the melt viscosity increases, the moldability is decreased.

A widely known polyester obtained from ethylene glycol and terephthalic acid is polyethylene terephthalate (PET). PET is a resin that has superior mechanical properties, electrical properties, flame-retarding properties, weatherability, resistance to chemicals, and the like.

However, PET has a slow rate of crystallization, so ordinarily, when it is injection-molded in a mold that is heated to 100° C. with the use of boiling water, PET solidifies rapidly so that crystallization of the resin cannot proceed sufficiently in the mold. For that reason, the dimensional stability of the articles obtained is poor, and the condition of the surface of the articles is not satisfactory. When PET is formed in a mold that is heated at a temperature of 130° C. or more, these disadvantages that arise from the slow rate of crystallization are overcome. However, in this case, the mold must be heated to a high temperature, which is economically disadvantageous.

In order to improve the crystallinity of PET, a variety of methods have been tried. For example, there is a method (1) in which the movement of polymer molecules is accelerated by the addition of a plasticizer, or by the copolymerization of a monomer, which confers plasticity on the polymer, by which means the molecular orientation needed for crystallization is promoted. Also, there is a method (2) in which crystallization can be promoted by the addition beforehand of an agent to accelerate crystallization.

Method 1 is disclosed in Japanese Patent Publication No. 47-3027, Japanese Patent Publication No. 47-4140, and Japanese Laid-Open Patent Publication No. 57-38849, in which it is disclosed that ethylene glycol or the like that forms soft segments is introduced into the polymer chain of an aromatic polyester. However, with this method, it is not possible to avoid declines in the heat stability, mechanical properties, and the like of the aromatic polyester.

Method 2 is disclosed in Japanese Laid-Open Patent Publication No. 54-158452, Japanese Laid-Open Patent Publication No. 56-57825, and Japanese Patent Publication No. 54-38622, in which the addition of a metal salt of an organic acid and PET with a high melting point is disclosed. However, when this kind of agent to accelerate crystallization is added, there are limits to the acceleration of the crystallization, and it may not be possible to accelerate the crystallization sufficiently.

Methods similar to the above include that disclosed in Japanese Laid-Open Patent Publication No. 55-82150, in which a specific crystallized compound is added to PET. However, the rate of crystallization of aromatic polyester with this method is slow. In Japanese Laid-Open Patent Publication No. 56-104933, a method is disclosed in which a compound that confers a liquid crystal segment structure is bound to the polyester molecules. However, with this method, the rate of crystallization of aromatic polyesters is not satisfactory.

SUMMARY OF THE INVENTION

A polyester, which overcomes the above-discussed and numerous other disadvantages and deficiencies of the prior art, comprises as main monomer components thereof a dicarboxylic acid and a diol, including a p-quaterphenyl derivative of the formula I:

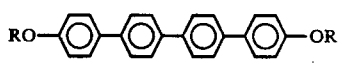 [I]

wherein the R groups independently, are —H or —CH$_2$CH$_2$OH.

In a preferred embodiment, the p-quaterphenyl derivative is 4,4'''-dihydroxy-p-quaterphenyl or 4,4'''-di(2-hydroxyethoxy)-p-quaterphenyl.

In a preferred embodiment, the said dicarboxylic acid is an aliphatic dicarboxylic acid. This polyester is suitable for use as a thermoplastic elastomer.

In a preferred embodiment, the said aliphatic dicarboxylic acid is of the formula II:

 [II]

wherein n is an integer from 0 to 10.

In a preferred embodiment, the said diol includes diol except for an aromatic diol in combination with said p-quaterphenyl derivative.

In a preferred embodiment, the said p-quaterphenyl derivative is present in an amount of from 0.1 to 30 mol % based on the total moles of monomer components of the polyester.

In a preferred embodiment, the said diol except for an aromatic diol is at least one selected from the group consisting of a glycol, a polyalkylene oxide, and a polysilicone that has two hydroxyl groups.

In a preferred embodiment, the polyester further comprises a lactone as a monomer component thereof.

In a preferred embodiment, the polyester further comprises an aromatic hydroxycarboxylic acid as a monomer component thereof.

In a preferred embodiment, the said dicarboxylic acid is an aromatic dicarboxylic acid. This polyester is suitable for use as an engineering plastic material (i.e., liquid-crystal polymer).

In a preferred embodiment, the said diol in the polyester that comprises the aromatic dicarboxylic acid includes an aromatic diol other than said p-quaterphenyl derivative in combination with said p-quaterphenyl derivative.

In a preferred embodiment, the said diol in the polyester that comprises the aromatic dicarboxylic acid includes diol except for an aromatic diol in combination with said p-quaterphenyl derivative.

In a preferred embodiment, the said polyester that comprises the aromatic dicarboxylic acid further comprises an aromatic hydroxycarboxylic acid as a monomer component thereof.

This invention also provides articles that contain the above-mentioned polyester. It is possible to obtain articles with elasticity from the polyester when it is used as a thermoplastic elastomer. It is possible to obtain articles with rigidity from the polyester when it is used as an engineering plastic material.

Thus, the invention described herein makes possible the objectives of: (1) providing a polyester that is a thermoplastic elastomer with excellent heat stability by the introduction of segments derived from the p-quaterphenyl derivative, which has a high degree of crystallinity and a melting point of 300° C. or higher, into the backbone of the aliphatic polyester chains or in the terminals of said chains; (2) providing a polyester with liquid-crystal properties that has excellent heat stability and mechanical properties; (3) providing a polyester that is rapidly crystallized and that also has excellent heat stability; (4) providing articles with elasticity that have excellent heat stability; (5) providing rigid articles with excellent heat stability.

BRIEF DESCRIPTION OF THE DRAWINGS

This invention may be better understood and its numerous objects and advantages will become apparent to those skilled in the art by reference to the accompanying drawing as follows.

DESCRIPTION OF THE PREFERRED EMBODIMENTS

Figure 1:
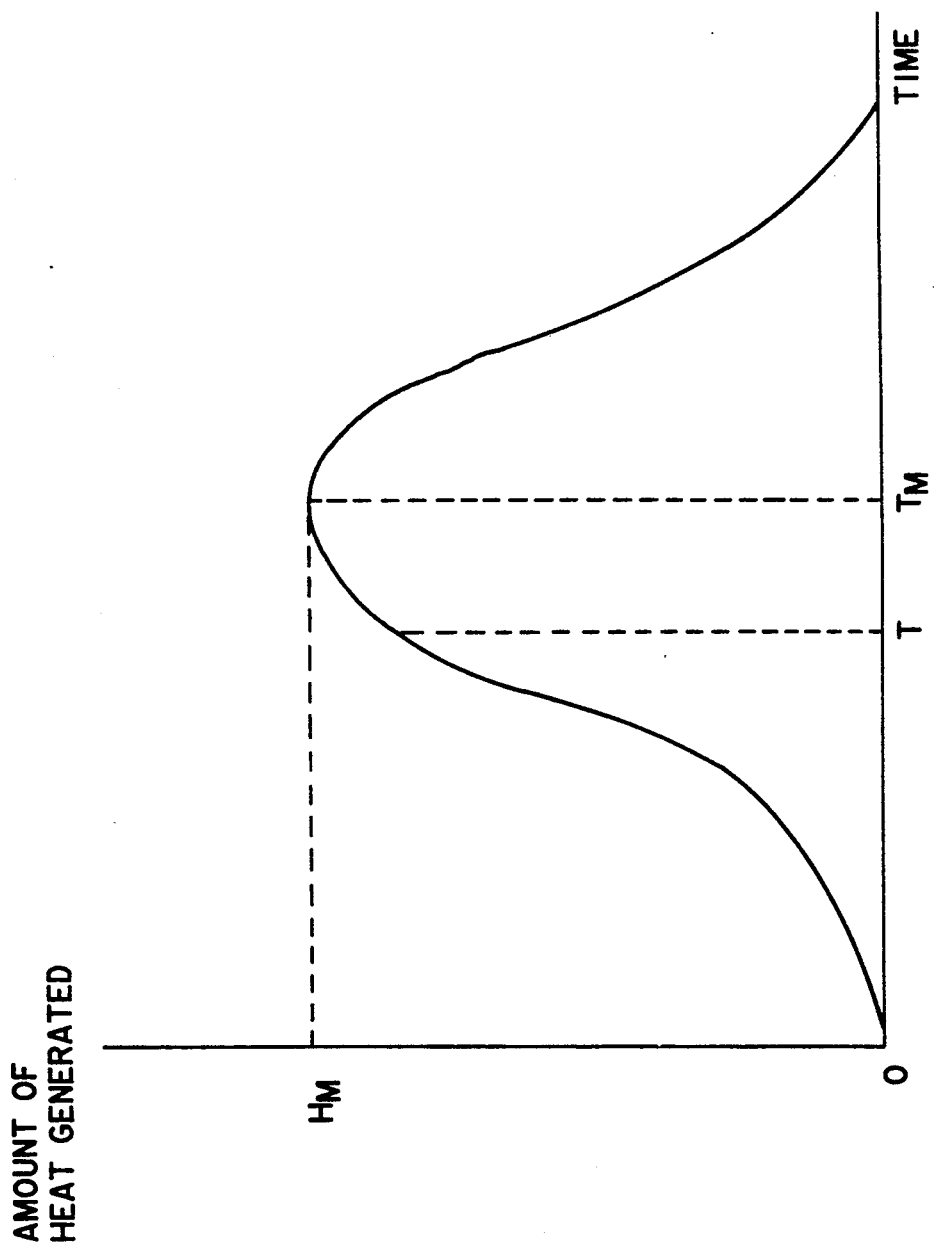
FIG. 1 is an exothermic curve that is used for the determination of the crystallization half-value period of the aromatic polyesters.

A polyester of this invention comprises as main monomer components thereof a dicarboxylic acid and a diol, including a p-quaterphenyl derivative of the formula I:

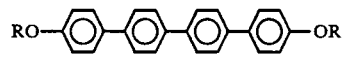 [I]

wherein the R groups, independently, are —H or —CH$_2$CH$_2$OH.

The use of appropriate kinds of dicarboxylic acid for the polyester mentioned above makes it possible to obtain a thermoplastic elastomer or an engineering plastic material (i.e., liquid-crystal polymer). When an aliphatic dicarboxylic acid is used as the dicarboxylic acid, a polyester with liquid-crystal properties suitable for use as a thermoplastic elastomer is obtained. As such aliphatic dicarboxylic acids, dicarboxylic acids of formula II are preferred:

 [II]

wherein n is an integer from 0 to 10.

By the use of a combination of p-quaterphenyl derivative I with a diol other than the p-quaterphenyl derivative I as the diol, such as, for example, a glycol, a polyalkylene oxide, a polysilicone that has two hydroxyl groups, etc., it is possible to obtain a polyester that is suitable for use as a thermoplastic elastomer with excellent elasticity.

Furthermore, by the use of an aromatic hydroxycarboxylic acid and/or lactone in addition to the above-mentioned components, it is possible to confer on the polyester a variety of properties. In this way, it is possible to obtain articles with elasticity from this type of polyester.

Also, it is possible to obtain an engineering plastic material (i.e., liquid-crystal polymer) with hardness and liquid-crystal properties by the use of an aromatic dicarboxylic acid as the dicarboxylic acid. This polyester has a high rate of crystallization and excellent heat stability. However, because the melting temperature is extremely high, melt-molding is difficult; also, impact resistance is low. Thus, to improve the characteristics of the polyester, it is preferable to use the p-quaterphenyl derivative mixed with diols other than the p-quaterphenyl derivative. The diols include glycols, polyalkylene oxides, polysilicones that have two hydroxyl groups, etc. By the use of this diol mixture, it is possible to obtain a polyester (i.e., liquid-crystal polymer) that can be melt-molded, which polyester has heat stability and excellent mechanical properties.

Also, by the use of monomer components such as an aromatic hydroxycarboxylic acid and/or lactone in addition to the above-mentioned monomer components, it is possible to confer a variety of properties on the polyester. Thus, it is possible to obtain rigid articles from this type of polyester.

p-Quaterphenyl derivative I used in the present invention is a compound of low molecular weight with liquid-crystal properties, for which it is preferable to use 4,4'''-dihydroxy-p-quaterphenyl of formula A and 4,4'''-di(2-hydroxyethoxy)-p-quaterphenyl of formula B:

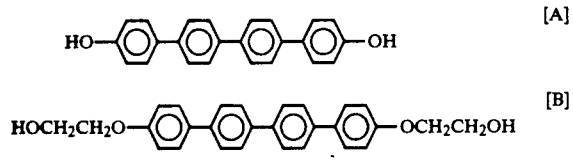

The transition temperature from a crystal to a liquid crystal for 4,4'''-dihydroxy-p-quaterphenyl A is 336° C., and this temperature for 4,4'''-di(2-hydroxyethoxy)-p-quaterphenyl B is 403° C. Here, "liquid crystal" is used to mean the state in which the compound has melted but the orientation of the molecules is still maintained.

It is acceptable to use 4,4'''-dihydroxy-p-quaterphenyl A or 4,4'''-di(2-hydroxyethoxy)-p-quaterphenyl B alone or in a mixture of both. When only 4,4'''-dihydroxy-p-quaterphenyl A is used alone as the p-quaterphenyl derivative, the heat stability tends to increase, but the moldability is slightly worsened. When 4,4'''-di(2-hydroxyethoxy)-p-quaterphenyl B is used in combination with the 4,4'''-dihydroxy-p-quaterphenyl A, it is possible to achieve satisfactory moldability.

As methods for the preparation of 4,4'''-dihydroxy-p-quaterphenyl A, there are, for example, the method described in the *Journal of the Chemical Society*, 1379–85 (1940), and another method in which 4-hydroxy-4'-bromobiphenyl is heated to react under pressure in the presence of alkali with use of a palladium catalyst, resulting in the sodium salt of 4,4'''-dihydroxy-p-quaterphenyl, and then acid is added to precipitate 4,4'''-dihydroxy-p-quaterphenyl. It is possible to obtain 4,4'''-di(2-hydroxyethoxy)-p-quaterphenyl B by the addition of ethylene oxide to 4,4'''-dihydroxy-p-quaterphenyl. 4,4'''-Diacetoxy-p-quaterphenyl and 4,4'''-di(2-acetoxyethoxy)-p-quaterphenyl obtained by the acetylation of 4,4'''-dihydroxy-p-quaterphenyl A and 4,4'''-di(2-hydroxyethoxy)-p-quaterphenyl B, respectively, can be used for the preparation of the polyester instead of the 4,4'''-dihydroxy-p-quaterphenyl A and the 4,4'''-di(2-hydroxyethoxy)-p-quaterphenyl B, respectively.

In general, the crystallinity of the molecules of liquid crystals is high, and as described before, the transition temperature of 4,4'''-dihydroxy-p-quaterphenyl A and 4,4'''-di(2-hydroxyethoxy)-p-quaterphenyl B from a crystal to a liquid crystal is high, so when these p-quaterphenyl derivatives are incorporated into a polymer chain, the polymer obtained has specific properties, as follows.

For example, if p-quaterphenyl derivative I and a compound that has a soft segment are used as the main monomer components of the polyester, a polyester that has the properties of a thermoplastic elastomer, with excellent heat stability, is obtained. The reason for this phenomenon is as follows. Because this polyester has soft segments and hard segments, the hard-segment portions of the chains of the polyester molecules come to be cross-linked physically, as mentioned above. At this time, because the crystallinity of the p-quaterphenyl derivative is high, the cross-linking is strong; also, the p-quaterphenyl derivative has a high liquid-crystal transition temperature, so the heat stability of the polyester obtained is excellent. These effects can be achieved even when only a small amount of p-quaterphenyl derivative is used. Also, because the polyester molecules contain soft segments, the polyester has the characteristics of a thermoplastic elastomer, with elasticity that originates from the soft segments.

When p-quaterphenyl derivative I and a compound that has hard segments are used as the main monomer components of the polyester, it is possible to obtain a liquid-crystal polymer that has excellent heat stability and mechanical properties. This is because the p-quaterphenyl derivative has the properties of a liquid crystal, and because its liquid-crystal transition temperature is high.

A polyester is prepared by the polycondensation of equimolar amounts of dicarboxylic acid and diol. The polyester of this invention can be varied at will by changes in the kind of p-quaterphenyl derivative and other monomer components and in their proportions so as to give articles made of the polyester that have the desired properties. That is, by changes in the kind of components of the polyester of this invention and changes in the proportions of the compounds used, a polyester suitable for use as a thermoplastic elastomer or as an engineering plastic material (i.e., a liquid-crystal polymer) can be obtained.

For a polyester suitable for use as a thermoplastic elastomer, it is preferable to use p-quaterphenyl derivative I and an aliphatic dicarboxylic acid as the main monomer components.

As the aliphatic dicarboxylic acid, it is preferable to use a compound of the formula:

$$HOOC-(CH_2)_n-COOH$$

where n is an integer of 0–10. If a dicarboxylic acid with 11 or more carbons is used, the physical properties of the articles made of the polyester will be worsened As this dicarboxylic acid, it is preferable to use, for example, oxalic acid, malonic acid, succinic acid, glutaric acid, adipic acid, suberic acid, or sebacic acid. These can be used alone or together in a mixture of two or more.

If the p-quaterphenyl derivative is used alone as the diol, the polyester obtained will be extremely hard and brittle. Also, because the melting point is extremely high, the melt-molding properties are inferior. Therefore it is preferable to use the p-quaterphenyl derivative and diol except for an aromatic diol as the diol.

As the diol except for an aromatic diol mentioned above, it is preferable to use at least one selected from the group consisting of a glycol, a polyalkylene oxide, and a polysilicone that has two hydroxyl groups.

As the glycol, glycols with 2 to 10 carbon atoms are preferred. Examples of the glycol include ethylene glycol, propylene glycol, trimethylene glycol, 1,4-butanediol, 1,3-butanediol, 1,5-pentanediol, 1,6-hexanediol, 1,7-heptanediol, 1,8-octanediol, 1,9-nonanediol, 1,10-decanediol, 1,2-cyclopentanediol, 1,2-cyclohexanediol, 1,3-cyclohexanediol, 1,4-cyclohexanediol, 1,4-cyclohexanedimethanol, etc. These can be used alone or together in a mixture of two or more.

As the polyalkylene oxide, polyethylene oxide, polypropylene oxide, polytetramethylene oxide, polyhexamethylene oxide, etc., are used. These can be used alone or together in a mixture of two or more.

If the number average molecular weight of the polyalkylene oxide is low, elasticity will not be conferred on the polyester made with it, and if it is too high, the heat stability of the polyester made with it will be low, and other physical properties will also be worsened. Thus, the preferable number average molecular weight is 100–20,000, and more preferably 500–5,000.

The polysilicone is an organopolysiloxane having two hydroxyl groups, and a polysilicone with two hydroxyl groups at the termini of the molecule is preferable. Examples of the polysilicone include dimethylpolysiloxane, diethylpolysiloxane, diphenylpolysiloxane, etc., with two hydroxyl groups at the termini of the molecule. If the number average molecular weight of the polysilicone is low, elasticity will not be conferred on the polyester made with it, and if it is too high, the polycondensation of a polyester from it will be difficult. Thus, the preferable number average molecular weight is 100–20,000, and more preferably 500–5000.

The polyester made from p-quaterphenyl derivative I, diol except for an aromatic diol, and an aliphatic dicarboxylic acid, which polyester is to be used as a thermoplastic elastomer, has low heat stability if the amount of the p-quaterphenyl derivative used is small; when the amount of the p-quaterphenyl derivative used is large, its tensile modulus is high and its elasticity is low, so that the polyester obtained is not suitable for use as a thermoplastic elastomer. Therefore, it is preferable to use the p-quaterphenyl derivative at the proportion of 0.1 to 30 mol % based on the total amount of monomer of the polyester; more preferably, the proportion is 0.5–20 mol %, and the most preferably, 1.0–10 mol %. Moreover, when polyalkylene oxide or polysilicone is used as the diol, the repeating unit in their molecules is counted as one monomer unit. That is, polyethylene oxide with a polymerization degree of 10 is counted as being 10 monomers.

In a polyester made from p-quaterphenyl derivative I, diol except for an aromatic diol, and an aliphatic dicarboxylic acid, it is possible to include lactone and/or an aromatic hydroxycarboxylic acid as monomer components.

The lactone reacts with a monomer that contains a carboxyl group and/or hydroxyl group in a ring-opening reaction, resulting in an aliphatic portion in the polyester chain. When lactone is used, the polyester becomes more elastic. As the lactone, lactones with four or more carbon atoms in their ring are preferable, and those with five to eight carbon atoms in the ring are more preferable. Examples of the lactone include -caprolactone, -valerolactone, -butyrolactone, and the like.

The amount of lactone to be used can be decided as the amount appropriate to give a polyester with the desired properties. If the amount of lactone used is large, the molecular weight of the polyester will not be high, and there is a tendency for the elasticity of the polyester to decrease, so it is preferable to use 90 mol % or less based on the total amount of monomer of the polyester, and more preferably 75 mol % or less.

The aromatic hydroxycarboxylic acid is a component that confers rigidity and liquid-crystal properties on the polyester. Examples of the hydroxycarboxylic acid include salicylic acid, m-hydroxybenzoic acid, p-hydroxybenzoic acid, 3-chloro-4-hydroxybenzoic acid, 3-bromo-4-hydroxybenzoic acid, 3-methoxy-4-hydroxybenzoic acid, 3-methyl-4-hydroxybenzoic acid, 3-phenyl-4-hydroxybenzoic acid, 2-hydroxy-6-naphthoic acid, 4-hydroxy-4'-carboxybiphenyl, etc. In particular, p-hydroxybenzoic acid, 2-hydroxy-6-naphthoic acid, and 4-hydroxy-4'-carboxybiphenyl are preferable.

The amount of the aromatic hydroxycarboxylic acid to be used can be decided as the amount appropriate to give a polyester with the desired properties. If the amount of aromatic hydroxycarboxylic acid used is large, the rigidity of the polyester increases, and elasticity is poor, so that it is not suitable for use as a thermoplastic elastomer. Thus, it is preferable to use 30 mol % or less based on the total moles of monomer components of the polyester, and the combined amount of the p-quaterphenyl derivative and the aromatic hydroxycarboxylic acid is preferably in the range of from 0.1–30 mol % based on the total moles of monomer components of the polyester.

In order to improve the mechanical and other properties of a polyester made of three components (i.e. p-quaterphenyl derivative I, diol except for an aromatic diol, and an aliphatic dicarboxylic acid) or of a polyester made of four components (i.e. p-quaterphenyl derivative I, diol except for an aromatic diol, an aliphatic dicarboxylic acid, and a lactone and/or aromatic hydroxycarboxylic acid), an aromatic diol other than the p-quaterphenyl derivative and/or an aromatic dicarboxylic acid may be included as monomer components.

Examples of the aromatic diol include hydroquinone, resorcinol, chlorohydroquinone, bromohydroquinone, methylhydroquinone, phenylhydroquinone, methoxyhydroquinone, phenoxyhydroquinone, 4,4'-dihydroxybiphenyl, 4,4'-dihydroxydiphenyl ether, 4,4'-dihydroxydiphenylsulfide, 4,4'-ddihydroxydiphenylsulfone, 4,4'-dihydroxybenzophenone, 4,4'-dihydroxydiphenylmethane, bisphenol A, 1,1-di(4-hydroxyphenyl)cyclohexane, 1,2-bis(4-hydroxyphenoxy)ethane, 1,4-dihydroxynaphthalene, 2,6-dihydroxynaphthalene, 4,4''-dihydroxy-p-terphenyl, 4,4'''-di(2-hydroxyethoxy)-p-terphenyl, and the like.

Examples of the aromatic dicarboxylic acid mentioned above include terephthalic acid, isophthalic acid, metal salts of 5-sulfoisophthalic acid, 4,4'-biphenyldicarboxylic acid, 4,4'-dicarboxydiphenyl ether, 4,4'-dicarboxydiphenyl sulfide, 4,4'-dicarboxydiphenyl sulfone, 3,3'-benzophenonedicarboxylic acid, 4,4'-benzophenonedicarboxylic acid, 1,2-bis(4-carboxyphenoxy)e- thane, 1,4-naphthalenedicarboxylic acid, 2,6-naphthalenedicarboxylic acid, and the like.

If a large amount of an aromatic diol other than the p-quaterphenyl derivative or an aromatic dicarboxylic acid is added, the polyester will lose elasticity, and properties of an engineering plastic material (i.e., liquid-crystal polymer) will be obtained rather than those of a thermoplastic elastomer. Therefore, the amount of the aromatic diol other than the p-quaterphenyl derivative and/or the aromatic dicarboxylic acid in the polyester is preferably 30 mol % or less, and more preferably, 25 mol % or less based on the total moles of monomer components of the polyester; and the combined amount of the p-quaterphenyl derivative, and the aromatic diol and/or aromatic dicarboxylic acid is preferably in the range of from 0.2 to 40 mol %, and more preferably 0.5 to 30 mol %, based on the total moles of monomer components of the polyester.

The polyester of this invention is hard when the proportion of monomers that are aromatic is high, and the properties obtained are those of an engineering plastic material (i.e., liquid-crystal polymer). Thus, to prepare a polyester that is suitable for use as a liquid-crystal polymer, p-quaterphenyl derivative I and an aromatic dicarboxylic acid should be used as the main components.

As aromatic dicarboxylic acids, those listed above can be used. Of said aromatic dicarboxylic acids, terephthalic acid, 4,4'-biphenyldicarboxylic acid, 4,4'-dicarboxydiphenyl ether, 4,4'-dicarboxydiphenyl sulfide, 4,4'-benzophenonedicarboxylic acid, 1,2-bis(4-carboxyphenoxy)ethane, and 2,6-naphthalenedicarboxylic acid are preferably used.

The diols include p-quaterphenyl derivative I, and it is also possible to use the above-mentioned aromatic diols and/or diols except for an aromatic diol as well. When the p-quaterphenyl derivative is used alone as the diol, or when the p-quaterphenyl derivative is used in combination with an aromatic diol, a problem occurs in that the polyester obtained is brittle, although its heat stability and mechanical properties are excellent. The same kind of polyester is obtained when an aromatic hydroxycarboxylic acid is used as an additional monomer component. When a lactone is used as an additional monomer component, the elasticity of the polyester obtained increases slightly. Nevertheless, the melting point of this polyester is high, and its melt-molding is difficult. Thus, to obtain an engineering plastic material with excellent melt-molding characteristics, it is preferable to use the p-quaterphenyl derivative and diol except for an aromatic diol together. As the diol except for an aromatic diol, at least one selected from the group consisting of the said glycol, polyalkylene oxide, and polysilicone with two hydroxyl groups are preferable.

In this case, if the amount of p-quaterphenyl derivative I used is small, the effects of the improvement in heat stability and mechanical properties decline. If the amount used is large, the melting point is very high, so that decomposition occurs before melting when it is heated. Thus, the amount of the p-quaterphenyl derivative used is preferably 0.1-20 mol % based on the total moles of monomer components of the polyester.

Polyester made of p-quaterphenyl derivative I, diol except for an aromatic diol, and an aromatic dicarboxylic acid can further comprise the aromatic hydroxycarboxylic acid and/or lactone mentioned above as monomer components.

When an aromatic hydroxycarboxylic acid is included as a monomer component, the amount of aromatic groups in the polyester is large. Thus, the heat stability and the liquid-crystal properties of the polyester tend to increase, but melt-molding becomes difficult. Therefore, the amount of aromatic hydroxycarboxylic acid to be used in the polyester is preferably 85 mol % or less based on the total moles of monomer components of the polyester, with the sum of this amount and the amount of the p-quaterphenyl derivative being 0.2-95 mol %, for preference. More preferably, the amount of aromatic hydroxycarboxylic acid is 75 mol % or less based on the total moles of monomer components of the polyester, with the sum of this amount and the amount of the p-quaterphenyl derivative being 0.5-85 mol %; the most preferably, the amount of aromatic hydroxycarboxylic acid is 50 mol % or less based on the total moles of monomer components of the polyester, with the sum of this amount and the amount of the p-quaterphenyl derivative being 1.0-60 mol %.

The addition of lactone increases the elasticity of the polyester, and decreases other properties such as mechanical properties and heat stability. Therefore, it is preferable that the amount of lactone used in the polyester be 75 mol % or less based on the total moles of monomer components of the polyester.

If the amount of diol except for an aromatic diol, aliphatic dicarboxylic acid, lactone, and the like, which are all aliphatic-type components, is large in the polyester of this invention, a thermoplastic elastomer with increased elasticity is obtained; if the amount of an aromatic diol, aromatic dicarboxylic acid, aromatic hydroxycarboxylic acid, and the like, which are all aromatic components, is large in the polyester of this invention, a liquid-crystal polymer with increased liquid-crystal properties and rigidity is obtained. There is not any fixed boundary between the two kinds of substances.

Next, the method for the preparation of the polyester of this invention will be described.

It is possible to prepare the polyester of this invention by any of the well-known methods for polycondensation. For example, the following methods can be used.

1. A direct reaction between dicarboxylic acid and diol.

2. A transesterification reaction between a lower alkyl ester of dicarboxylic acid and diol.

3. A reaction between halogenated dicarboxylic acid and diol in an appropriate solvent of pyridine or the like.

4. A reaction between an alcholate of diol and a halogenated dicarboxylic acid.

5. A transesterification reaction between an acetylated diol and a dicarboxylic acid.

The polyester of this invention can take on various structures by changes in the order of the addition of p-quaterphenyl derivative at the time of polycondensation. For example, when p-quaterphenyl derivative I is added together with the dicarboxylic acid and the other diol component, a random copolymer is readily obtained. When p-quaterphenyl derivative I is added at a late stage of the polycondensation, a block copolymer is readily obtained. Furthermore, when the above-mentioned p-quaterphenyl derivative or an acetylated p-quaterphenyl derivative is added to an already prepared polyester and mixed by being kneaded under reduced pressure with heat, it is possible to introduce segments derived from the p-quaterphenyl derivative into the chain of the polyester molecules by reaction with elimination of ethylene glycol or by transesterification. When the polycondensation mentioned above is carried out, catalysts that are generally used in the preparation of polyesters can be used. Examples of such catalysts include metals such as lithum, sodium, potassium, cesium, magnesium, calcium, barium, strontium, zinc, aluminium, titanium, cobalt, germanium, tin, lead, antimony, arsenic, cerium, boron, cadmium, manganese, and the like; organometallic compounds containing of these metals; salts of organic acids; metal alkoxides and metal oxide.

Among such catalysts, especially preferred are calcium acetate, diacyltin, tetraacyltin, dibutyltin oxide, dibutyltin dilaurate, dimethyltin maleate, dioctyltin, tetraacetyltin, triisobutylaluminium, tetrabutyl titanate, germanium dioxide, and antimony trioxide. It is also possible to use a mixture of two or more of these catalysts. In order to remove efficiently by-products arising from polycondensation such as water, alcohols, glycols, and the like, and to obtain a polyester of high molecular weight, it is preferable to reduce the pressure of the reaction system to 1 mm Hg or less at the late stage of the polycondensation. In general, the reaction temperature is 150°-350° C.

The polyester of this invention can be used for many applications in admixture with various additives such as inorganic fibers, organic fibers, inorganic fillers, heat stabilizers, flame retardants, UV absorbers, antioxidants, antistatic agents, or agents to accelerate crystallization, provided that the properties of the polyester used will not be degraded.

The inorganic fibers mentioned above include glass fiber, carbon fiber, boron fiber, silicon carbide fiber, alumina fiber, amorphous fiber, silicon-titanium-carbon inorganic fiber, and the like. The organic fibers include aramide fiber and the like. The inorganic fillers include calcium carbonate, titanium oxide, mica, talc, and the like.

The heat stabilizers include triphenylphosphite, trilaurylphosphite, tris(nonylphenyl)phosphite, 2-tert-butyl-α-(3-tert-butyl-4-hydroxyphenyl)-p-cumenylbis (p-nonylphenyl)phosphite, and the like. The flame retardants include hexabromocyclododecane, tris-(2,3-dichloropropyl)phosphate, pentabromophenyl arylether, and the like. The UV absorbers include p-tert-butylphenyl salicylate, 2-hydroxy-4-methoxybenzophenone, 2-hydroxy-4-methoxy-2'-carboxybenzophenone, 2,4,5-trihydroxybutyrophenone, and the like. The antioxidants include butylhydroxyanisol, butylhydroxytoluene, distearyl thiodipropionate, dilauryl thiodipropionate, hindered phenol antioxidants, and the like. The antistatic agents include N,N-bis(hydroxyethyl)alkylamine, alkylarylsulfonate, alkylsulfonate, and the like. The agents to accelerate crystallization include inorganic substrates such as barium sulfate, alumina, and silicon oxide; salts of higher fatty acids such as sodium stearate, barium stearate, and sodium palmitate; organic substances such as benzyl alcohol and benzophenone; highly crystallized polyethylene terephthalate; highly crystallized poly-trans-cyclohexanedimethanol terephthalate; and the like. It is possible to mix the polyester of this invention with other thermoplastic resins such as polyolefin, modified polyolefin, polystyrene, polyamide, polycarbonate, polysulfone, polyester, etc., or with rubber, so as to change the properties of the polyester.

The polyester of this invention can be formed into articles of the desired shape by compression molding, extrusion molding, injection molding, blow molding, and the like. The physical properties of the articles can be changed as desired by changes in the monomer components used and the proportions of the components used. When the polyester is prepared for use as a thermoplastic elastomer, it is appropriate as a material for automotive parts, hoses, belts, packing, and such articles that have elasticity, and for paints, adhesives, and so on.

When the polyester is prepared as a liquid-crystal polymer (i.e., engineering plastic material), it is appropriate as a material for articles such as machine parts that have rigidity including pipes, electronic parts, fibers, films, sheets; and for paints, adhesives, etc.

EXAMPLES

Below, this invention will be explained with reference to examples.

The properties of the engineering plastic compositions obtained in the following examples and comparative examples were evaluated by the following methods.

Measurement of Physical Properties (a) Melting point

The sample was pressed into a sheet 0.3 mm thick and then heated at the rate of 5° C./min. A polarization microscope with a hot stage was used for the observation of the sample. The temperature at which optical anisotropy of the sample was observed to disappear was regarded as the melting point of the sample.

(b) Liquid-crystal transition temperature

The sample was dissolved in o-chlorophenol and formed into a film about 50 μm thick by casting. The film was heated at the rate of 5° C./min and observed with a polarization microscope for the purpose of determining the temperature at which there occurred a transition of the sample film from the crystal state to the liquid-crystal state.

(c) Vicat softening point A

A sample in the shape of a sheet 3 mm thick formed by being pressed was examined by the method of JIS K7206 (JIS K7206 corresponds to ASTM D1525) for the Vicat softening point A.

(d) Mechanical properties (tensile modulus, tensile strength, elongation at rupture, and Shore hardness)

The sample was dried for 6 hours or more at 120° C., and formed into a No. 3 dumbbell, JIS K 6301 (JIS K6301 corresponds to ASTM D412-61T) by use of an injection molder (Toshiba Machine Co. Ltd., IS 30 EPN) at a cylinder temperature of 250°-330° C., nozzle temperature of 260°-350° C., and mold temperature of 70° C. This No. 3 dumbbell was used in a stretching test conducted with a Shimadzu Autograph AGB-5000, and tensile modulus, tensile strength, and elongation at rupture were measured according to ASTM D638. The Shore hardness D was measured according to JIS K7215 (JIS K7215 corresponds to ASTM D785 and D2240).

Preparation of p-quaterphenyl Derivatives (A) 4,4'''-Dihydroxy-p-quaterphenyl Into an 1-liter stainless steel autoclave were added 60.0 g of 4-hydroxy-4'-bromobiphenyl, 100 g of methanol, 300 g of a 10% (by weight) aqueous solution of sodium hydroxide, and 13 g of a palladiumcarbon containing 5% by weight of palladium and a reaction was carried out at 120° C. for 4 hours under 5 atmospheric pressures. The precipitated disodium salt of 4,4'''-dihydroxy-p-quaterphenyl was filtered and dissolved into N,N-dimethyl-formamide. The catalyst was removed by filtration with heating at 60° C. An addition of dilute sulfuric acid to the filtrate gave white crystalline powder of 4,4'''-dihydroxy-p-quaterphenyl (DHQ), which was purified by washing with methanol. The liquid-crystal transition temperature of the DHQ was 336° C. and the melting point of the DHQ was 420° C.

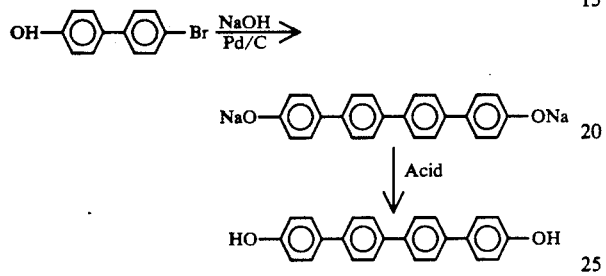

(B) 4-4'''-Diacetoxy-p-quaterphenyl

The DHQ obtained in section A mentioned above was reacted with acetic anhydride in the moler ratio of 1:2 to 1:2.2 at 160° C. for 3 hours, and the crude product was recrystallized, resulting in 4,4'''-diacetoxy-p-quaterphenyl (DAQ). The liquid-crystal transition temperature of the DAQ was 340° C. and the melting point of the DAQ was 346° C.

(C) 4,4'''-Di(2-hydroxyethoxy)-p-quaterphenyl

By the reaction of the DHQ obtained in section A mentioned above with ethylene oxide in the presence of sodium carbonate, 4,4'''-di(2-hydroxyethoxy)-p-quaterphenyl (DHEQ) was obtained. The liquid-crystal transition temperature of the DHQ was 403° C. and the melting point of the DHEQ was 412° C.

(D) 4,4'''-Di(2-acetoxyethoxy)-p-quaterphenyl

By the reaction of the DHEQ obtained in section C mentioned above with acetic anhydride, 4,4'''-di(2-acetoxyethoxy)-p-quaterphenyl (DAEQ) was obtained. The liquid-crystal transition temperature of the DHEQ was 329° C. and the melting point of the DAEQ was 387° C.

EXAMPLES 1-3

Synthesis of bis(2-hydroxyethyl)adipate (BHEA)

Into a 1-liter glass flask equipped with a stirrer, thermometer, gas inlet, and distillation outlet were added 87.1 g (0.50 moles) of dimethyl adipate, 74.4 g (1.20 moles) of ethylene glycol, and small amounts of calcium acetate and antimony trioxide as catalysts. The mixture in the flask was purged with nitrogen, heated to 180° C. and reacted at this temperature for 2 hours. BHEA was produced by the removal of methanol from the flask by distillation.

Preparation of Polyester

To the reaction mixture in the flask obtained above, DHQ was added at the molar ratio shown in Table 2. The mixture was heated to 280° C. and reacted for about 2 hours. Then, after the distillation outlet was connected to a vacuum device, the mixture was reacted at this temperature for 1 hour under reduced pressure of 1 mm Hg. As the reaction proceeded, a highly viscous liquid was formed by removal of ethylene glycol from the flask. The liquid (a polyester) was solidified.

The physical properties of the resulting polyester such as the melting point were evaluated. Table 2 shows the results of the measurements.

TABLE 2

| | DHQ (mol) | BHEA (mol) | Melting point (°C.) | Tensile Strength (kgf/cm$^2$) | Elongation at rupture (%) | Tensile modulus (kgf/cm$^2$) | Shore hardness D |
|---|---|---|---|---|---|---|---|
| Example 1 | 0.05 | 1.00 | 228 | 188 | 1380 | 182 | 33 |
| Example 2 | 0.10 | 1.00 | 336 | 232 | 1230 | 258 | 37 |
| Example 3 | 0.15 | 1.00 | 363 | 242 | 870 | 322 | 42 |

DHQ: 4,4'''-Dihydroxy-p-quaterphenyl
BHEA: Bis(2-hydroxyethyl)adipate

EXAMPLES 4-7 AND COMPARATIVE EXAMPLE 1

A polyester was prepared by the procedure of Example 1 except that DHEQ was added at the molar ratio shown in Table 3 to the reaction mixture containing BHEA. The melting point of the resulting polyester was measured. Table 3 shows the results of the measurements.

Comparative Examples 2 and 3

The melting points of PELPLENE ® S-9001, commercially available from Toyo Boseki Co. Ltd., (Comparative Example 2), and HYTREL ® 7247, available from Toray-Dupont Inc. (Comparative Example 3), were measured. Table 3 shows the results of the measurements.

EXAMPLE 8

To 149.1 g (0.50 moles) of the BHEA obtained in Example 1, 16.9 g (0.05 moles) of DHQ and 44 g of polyethylene oxide (number average molecular weight, 1,000) were added. The flask was heated to 260° C., and the mixture in the flask was reacted at this temperature for about 1 hour. Then, after the distillation outlet was connected to a vacuum device, the mixture was reacted for 1 hour under reduced pressure of 1 mm Hg. As the reaction proceeded, a highly viscous liquid as a polymer was formed with the distillation of ethylene glycol from the flask. The viscous liquid was solidified.

The melting point and Shore hardness D of the resulting polyester were measured. Table 4 shows the results of the measurements.

EXAMPLE 9

A polyester was prepared by the procedure of Example 1 except that 21.3 g (0.05 moles) of DHEQ and 36 g of polytetramethyleneoxide (number average molecular weight; 800) were added to 149.1 g (0.50 moles) of the BHEA produced in Example 1. The melting point and Shore hardness D of the resulting polyester was measured. Table 4 shows the results of the measurements.

Comparative Example 4

The procedure of Example 8 was repeated, except that DHQ was not used. A polyester of high molecular weight was not obtained because of the thermal decomposition of the products in the reaction mixture, with coloration of the reaction mixture.

Comparative Examples 5-8

The melting points and Shore hardnesses D of PELPLENE® p-40 and PELPLENE® 9001, available from Toyo Boseki Co. Ltd. (Comparative Examples 5 and 6), and HYTREL® 4057 and HYTREL® 7247, available from Toray-Dupont Inc. (Comparative Examples 7 and 8) were measured. Table 4 shows the results of the measurements.

EXAMPLE 10

To 149.1 g (0.50 moles) of BHEA obtained in Example 1, 6.6 g (0.025 moles) of 4,4''-dihydroxy-p-terphenyl and 8.5 g (0.025 moles) of DHQ were added. The mixture was heated to 300° C. and reacted at this temperature for 1 hour under reduced pressure of 1 mm Hg. As the reaction proceeded, a highly viscous liquid as a polyester was formed with the distillation of ethylene glycol. The melting point of the polyester was 269° C.

EXAMPLE 11

Synthesis of bis(2-hydroxyethyl)adipate (BHEA)

A 1-liter glass flask equipped with a stirrer, thermometer, gas inlet, and distillation outlet was charged with 174.2 g (1.00 mole) of dimethyl adipate, 198.3 g (2.20 moles) of ethylene glycol, and a small amount of tetrabutyl titanate as a catalyst. The mixture in the flask was purged with nitrogen, heated to 190° C., and reacted at this temperature for 1 hour. As the reaction proceeded, bis(2-hydroxyethyl)adipate was produced with the distillation of methanol from the flask.

Preparation of Polyester

To the reaction mixture obtained above, 33.8 g (0.10 moles) of DHQ and 11.0 g (0.10 moles) of hydroquinone were added. The mixture was heated to 300° C. and reacted for 1 hour at this temperature. Then, after the distillation outlet was connected to a vacuum device, the mixture was reacted at this temperature for 30 minutes under reduced pressure of 1 mm Hg. As the reaction proceeded, a highly viscous liquid was formed with the distillation of ethylene glycol from the flask. The viscous liquid was solidified by being cooled to 260° C., and then polymerized by solid-phase polycondensation under 0.3 mm Hg at 260° C. for 2 hours to produce a polyester. The melting point of the resulting polyester was 308° C.

EXAMPLE 12

A flask equipped as in Example 11 was charged with 230.3 g (1.00 mole) of dimethyl sebacate, 198.3 g (2.20 moles) of 1,4-butanediol, 45.7 g (0.20 moles) of bisphenol A, 41.6 g (0.10 moles) of DHEQ, and small amounts of calcium acetate and antimony trioxide as catalysts, and a small amount of phosphite compound as a heat stabilizer. The mixture was reacted at 200° C. for 1 hour and at 320° C. for 1 hour, and then reacted under reduced pressure of 1 mm Hg at 300° C. for 1 hour. As the reaction proceeded, a highly viscous liquid was formed with the distillation of methanol and 1,4-butanediol from the flask. The liquid (a polyester) was solidified. The melting point of the resulting polyester was 263° C.

EXAMPLE 13

A 1-liter glass flask equipped with a stirrer, thermometer, gas inlet, and distillation outlet was charged with 156.8 g (0.90 moles) of dimethyl adipate, 19.4 g (0.10 moles) of dimethyl terephthalate, 198.3 g (2.20 moles) of 1,4-butanediol, and a small amount of tetrabutyl titanate as a catalyst. The mixture in the flask was purged with nitrogen, heated to 200° C., and reacted at this temperature for 1 hour. As the reaction proceeded, a polyester A with low molecular weight was produced with the distillation of methanol from the flask.

To the reaction mixture obtained above, 33.8 g (0.10 moles) of DHQ was added. The mixture was heated to 320° C., and reacted for 1 hour. Then, after the distillation outlet was connected to a vacuum device, the mixture was reacted at this temperature for 30 minutes and at 300° C. for 1 hour under reduced pressure of 1 mm Hg. As the reaction proceeded, a highly viscous liquid was formed with the distillation of 1,4-butanediol from the flask. The liquid (a polyester) was solidified. The melting point of the resulting polyester was 295° C.

The same procedure was repeated except that DHQ was not used in order to polymerize only the polyester A with low molecular weight. The melting point of the resulting polymer was 34° C.

EXAMPLE 14

A 1-liter autoclave equipped with a stirrer, thermometer, gas inlet, and distillation outlet was charged with 122 g (0.70 moles) of suberic acid, 49.8 g (0.30 moles) of terephthalic acid, 198.3 g (2.20 moles) of 1,4-butanediol, and small amounts of antimony trioxide and calcium acetate as catalysts. The mixture was reacted at 220° C. at a pressure of 3 kg/cm$^2$ under a nitrogen atmosphere. As the reaction proceeded, a polyester B with low molecular weight was formed with the distillation of water from the flask.

To the reaction mixture obtained above, 41.6 g (0.10 moles) of DHEQ was added. The mixture was heated to 300° C., reacted at this temperature for 2 hours at ordinary pressure, and reacted for 1 hour under reduced pressure of 1 mm Hg. As the reaction proceeded, a highly viscous liquid was formed with the distillation of 1,4-butanediol from the flask. The liquid (a polyester) was solidified. The melting point of the resulting polyester was 260° C.

The same procedure was repeated except that DHQ was not used in order to polymerize only the polyester B of low molecular weight. The melting point of the resulting polymer was 42° C.

EXAMPLE 15

To 149.1 g (0.50 moles) of BHEA obtained in Example 1, 16.9 g (0.05 moles) of DHQ and 70 g of polydimethyl siloxane ($\overline{Mn}=2,000$) were added. The mixture in the flask was heated to 280° C., and reacted for about 2 hours. Then, after the distillation outlet was connected to a vacuum device, the mixture was reacted at this temperature for 1 hour under reduced pressure of 1 mm Hg. As the reaction proceeded, a highly viscous liquid was formed with the distillation of ethylene glycol from the flask. The liquid (a polyester) was solidified. The melting point of the resulting polyester was 248° C.

EXAMPLE 16

Synthesis of bis(4-hydroxybutyl)sebacate

Bis(4-hydroxybutyl)sebacate was prepared by the procedure of Example 1 except that 115.2 g (0.50 moles) of dimethyl sebacate and 108.1 g (1.20 moles) of 1,4-butanediol were used instead of dimethyl adipate and ethylene glycol, respectively.

Preparation of Polyester

To the reaction mixture obtained above, 41.6 g (0.10 moles) of DHEQ and 20 g of polydimethyl siloxane ($\overline{Mn}=1,000$) were added. The mixture was heated to 300° C. and reacted for about 2 hours. Then, after the distillation outlet was connected to a vacuum device, the mixture was reacted at this temperature for 1 hour under reduced pressure of 1 mm Hg. As the reaction proceeded, a highly viscous liquid was formed with the distillation of 1,4-butanediol from the flask. The liquid (a polyester) was solidified. The melting point of the resulting polyester was 298° C.

The same procedure was repeated except that DHEQ was not used in order to polymerize only the bis(4-hydroxybutyl)sebacate. The melting point of the resulting polymer was 60° C.

EXAMPLE 17

Synthesis of poly ε-caprolactone

A glass flask equipped with a stirrer, thermometer, and gas outlet was charged with 114.1 g (1.00 mole) of ε-caprolactone, 3.1 g (0.05 moles) of ethylene glycol, and a small amount of tetrabutyl titanate. The mixture was reacted at 160° C. for 8 hours to obtain poly ε-caprolactone as a viscous liquid.

Preparation of Polyester

To 149.1 g (0.50 moles) of BHEA obtained in Example 1, 60 g of poly ε-caprolactone obtained above and 25.4 g (0.075 moles) of DHQ were added. The mixture was heated to 260° C. and reacted for about 1 hour. Then, after the distillation outlet was connected to a vacuum device, the mixture was reacted at this temperature for 1 hour under reduced pressure of 0.5 mm Hg. As the reaction proceeded, a highly viscous liquid as a polyester was formed with the distillation of ethylene glycol from the flask. The melting point and Shore hardness D of the resulting polyester were measured. Table 4 shows the results of the measurements.

EXAMPLE 18

Synthesis of poly ε-caprolactone

A flask equipped as in Example 17 was charged with 114.1 g (1.00 mole) of ε-caprolactone, 42.7 g (0.10 moles) of DHEQ, and a small amount of tetrabutyl titanate. The mixture was reacted at 180° C. for 12 hours to obtain poly ε-caprolactone as a viscous liquid.

Preparation of Polyester

To 149.1 g (0.50 moles) of the BHEA produced in Example 1, the total amount of poly ε-caprolactone produced above was added. The mixture was heated to 280° C. and reacted for 30 minutes. Then, after the distillation outlet was connected to a vacuum device, the mixture was reacted at this temperature for 1.5 hours under reduced pressure of 0.3 mm Hg. As the reaction proceeded, a highly viscous liquid as a polyester was formed with the distillation of ethylene glycol from the flask. The melting point and Shore hardness D of the resulting polyester were measured. Table 4 shows the results of the measurements.

TABLE 3

|  | DHEQ (mol) | BHEA (mol) | Melting point (°C.) |
|---|---|---|---|
| Example 4 | 0.05 | 1.00 | 258 |
| Example 5 | 0.10 | 1.00 | 285 |
| Example 6 | 0.20 | 1.00 | 296 |
| Example 7 | 0.30 | 1.00 | 358 |
| Comparative Example 1 | — | 1.00 | 48 |
| Comparative Example 2 | Toyobo Co. Ltd. PELPLENE ® S-9001 | | 223 |
| Comparative Example 3 | Toray-Dupont Inc. HYTREL ® 7247 | | 219 |

1) DHEQ: 4,4'''-Di(2-hydroxyethoxy)-p-quaterphenyl
2) BHEA: Bis(2-hydroxyethyl)adipate

TABLE 4

|  | Melting point (°C.) | Shore hardness D |
|---|---|---|
| Example 8 | 226 | 30 |
| Example 9 | 218 | 26 |
| Example 17 | 260 | 31 |
| Example 18 | 242 | 27 |
| Comparative Example 5 | 180 | 31 |
| Comparative Example 6 | 223 | 78 |
| Comparative Example 7 | 163 | 40 |
| Comparative Example 8 | 219 | 72 |

Tables 3 and 4 show that a polyester with a p-quaterphenyl derivative in its polymer chains has a higher melting point than a commercial thermoplastic elastomer with the same hardness at room temperature. Thus, it can be seen that the polyester is excellent in heat stability.

EXAMPLE 19

A 1-liter glass flask equipped with a stirrer, thermometer, gas inlet, and distillation outlet was charged with 42.2 g (0.10 moles) of DAQ, 16.6 g (0.10 moles) of terephthalic acid (TPA), 72.1 g (0.40 moles) of p-acetoxybenzoic acid (PAB), and 138.1 g (0.60 moles) of 2-acetoxy-6-naphthoic acid ANA. The mixture in the flask was purged with nitrogen and heated to 260° C. A polycondensation reaction proceeded with the distillation of acetic acid as a by-product through the distillation outlet. After the reaction was carried out for about 2 hours, the mixture was heated to 280° C. and reacted at this temperature for 1 hour, and then at 300° C. for 1 hour. Then, after the distillation outlet was connected to a vacuum device, the mixture was reacted at 320° C. for 30 minutes under reduced pressure of 30 mm Hg or less and at 340° C. for 30 minutes at 1 mm Hg or less. A highly viscous liquid was formed in the flask. The liquid was an aromatic polyester. When the flask was cooled to room temperature, the viscous liquid was solidified. Then, the solidified product was taken out of the flask by breaking of the flask.

The liquid-crystal transition temperature and Vicat softening point A of the resulting aromatic polyester were measured. Table 5 shows the results of the measurements.

EXAMPLES 20–22 AND COMPARATIVE EXAMPLE 9

An aromatic polyester was prepared by the procedure of Example 19 except that the molar ratio of the monomer components was changed as shown in Table 5. The liquid-crystal transition temperature and Vicat softening point A of the resulting aromatic polyester were measured. Table 5 shows the results of the measurements.

EXAMPLE 23

A 3-liter metal vessel equipped with a stirrer, thermometer, gas inlet, and distillation outlet was charged with 153.2 g (0.30 moles) of DAEQ, 49.8 g (0.30 moles) of terephthalic acid (TPA), 243.2 g (1.35 moles) of p-acetoxybenzoic acid (PAB), and 379.9 g (1.65 moles) of 2-acetoxy-6-naphthoic acid (ANA). The mixture in the vessel was purged with argon, heated to 250° C., and reacted at this temperature. A polycondensation proceeded with the distillation of acetic acid as a by-product through the distillation outlet. After the reaction was carried out for about 2 hours, the mixture was heated to 320° C. and reacted at this temperature for 30 minutes. Then, after the distillation outlet was connected to a vacuum device, the mixture was reacted at 320° C. for 1 hour under reduced pressure of 20 mm Hg and for 30 minutes at 0.1 mm Hg or less. A highly viscous liquid was formed in the vessel. The viscous liquid was taken out of the outlet connected to the bottom of the vessel. The liquid (an aromatic polyester) was solidified.

The liquid-crystal transition temperature and Vicat softening point A of the resulting aromatic polyester were measured. Table 5 shows the results of the measurements.

EXAMPLES 24–26

An aromatic polyester was prepared by the procedure of Example 23 except that the molar ratio of the monomer components was changed as shown in Table 5. The liquid-crystal transition temperature and Vicat softening point A of the resulting aromatic polyester were measured. Table 5 shows the results of the measurements.

EXAMPLE 27

A 3-liter glass flask equipped with a stirrer, thermometer, gas inlet, and distillation outlet was charged with 42.7 g (0.10 moles) of DHEQ, 205.5 g (0.90 moles) of bisphenol A (BPA). and 166.2 g (1.00 mole) of dimethyl terephthalate (TPM). The mixture in the flask was purged with nitrogen, heated to 280° C., and reacted at this temperature with stirring. As the polycondensation reaction proceeded, methanol as a by-product was distilled through the distillation outlet. After the reaction had proceeded for about 1 hour, the mixture was heated to 300° C., and reacted at this temperature for 1 hour, and then at 320° C. for 1 hour. Then, after the distillation outlet was connected to a vacuum device, the mixture was reacted at this temperature for 1 hour under reduced pressure of 50 mm Hg, for 30 minutes at 5 mm Hg, and for 30 minutes at 0.1 mm Hg to obtain an aromatic polyester.

The liquid-crystal transition temperature and Vicat softening point A of the resulting aromatic polyester were measured. Table 6 shows the results of the measurements.

EXAMPLES 28 AND 29

An aromatic polyester was prepared by the procedure of Example 27 except that the molar ratio of the components was changed as shown in Table 6. The liquid-crystal transition temperature and Vicat softening point A of the resulting aromatic polyester were measured. Table 6 shows the results of the measurements.

EXAMPLE 30

A 3-liter glass flask equipped with a stirrer, thermometer, gas inlet, and distillation outlet was charged with 422.5 g (1.00 mole) of DAQ, 194.2 g (1.00 mole) of 1,4-diacetoxybenzene, 166.1 g (1.00 mole) of terephthalic acid (TPA), 166.1 g (1.00 mole) of isophthalic acid, and 360.4 g (2.00 moles) of p-acetoxybenzoic acid. The mixture in the flask was purged with nitrogen and was heated to 300° C. The polycondensation reaction proceeded with the distillation of acetic acid as a by-product through the distillation outlet. After the reaction was carried out for about 2 hours, the mixture was heated to 320° C. and reacted at this temperature for 1 hour. Then, after the distillation outlet was connected to a vacuum device, the mixture was reacted at 340° C. for 1 hour at the reduced pressure of 1 mm Hg or less. A hard solid was formed in the flask, so the solidified product was taken out of the flask by breaking of the flask. The product was an aromatic polyester.

The resulting aromatic polyester was a brown solid. The liquid-crystal transition temperature and Vicat softening point A of the aromatic polyester were 348° C. and 329° C., respectively.

EXAMPLE 31

A flask equipped as in Example 30 was charged with 128.0 g (0.30 moles) of DHEQ, 60.9 g (0.30 moles) of terephthaloyl dichloride, 400 ml of nitrobenzene, and a small amount of triethylamine. After the flask was purged with nitrogen, the mixture was refluxed for 10 hours. A white solid product was obtained by the distillation of nitrobenzene. The product was crude aromatic polyester. The product was dissolved into o-chlorophenol, and methanol was added for reprecipitation, thus giving a purified product.

The liquid-crystal transition temperature and Vicat softening point A of the resulting aromatic polyester were 406° C. and 318° C., respectively.

EXAMPLE 32

A flask equipped as in Example 30 was charged with 33.8 g (0.10 moles) of DHQ, 205.5 g (0.90 moles) of bisphenol A and 1.5 of 1.5N aqueous solution of sodium hydroxide. After the flask was purged with nitrogen, 0.5 of a methylene chloride solution containing 203 g (1.00 mole) of terephthaloyl dichloride was added dropwise to the flask at room temperature for 1 hour. The mixture was reacted with stirring at 80° C. for 6 hours to obtain a viscous product. To this viscous product, an excess amount of methanol was added, resulting in a precipitate of aromatic polyester. The liquid-crystal transition temperature and Vicat softening point A of the aromatic polyester were 281° C. and 209° C., respectively.

EXAMPLE 33

An aromatic polyester was prepared by the procedure of Example 32, except that 0.30 moles of DHQ, 0.70 moles of bisphenol A, 0.60 moles of terephthaloyl dichloride, and 0.40 moles of isophthaloyl dichloride were used as monomer components.

The liquid-crystal transition temperature and Vicat softening point A of the resulting aromatic polyester were 319° C. and 218° C., respectively.

EXAMPLE 34

A 1-liter glass flask equipped with a stirrer, thermometer, gas inlet, and distillation outlet was charged with 33.8 g (0.10 moles) of DHQ, 55.8 g (0.90 moles) of ethylene glycol, 166.1 g (1.00 mole) of terephthalic acid, 122.4 g (1.20 moles) of acetic anhydride, and a small amount of dimethyltin maleate as a catalyst. The mixture in the flask was purged with nitrogen, heated to 150° C., and reacted at this temperature for 2 hours, at 260° C. for 2 hours, and then at 300° C. for 2 hours while a by-product was distilled through the distillation outlet. Then, after the distillation outlet was connected to a vacuum device, the mixture was heated gradually to 340° C., and the mixture was reacted for 2 hours under reduced pressure to obtain an aromatic polyester.

The liquid-crystal transition temperature and Vicat softening point A of the resulting aromatic polyester were 270° C. and 112° C., respectively.

EXAMPLE 35

A flask equipped as in Example 34 was charged with 42.7 g (0.10 moles) of DHEQ, 93 g (1.50 moles) of ethylene glycol, 194.1 g (1.00 mole) of dimethyl terephthalate, and small amounts of antimony oxide and calcium acetate as catalysts. The mixture in the flask was purged with nitrogen and heated to 160° C. The mixture was reacted at this temperature for 1 hour and at 200° C. for 1 hour under ordinary pressure while a by product was distilled through the distillation outlet. Then, after the distillation outlet was connected to a vacuum device, the mixture was reacted at 260° C. for 1 hour under reduced pressure of 100 mm Hg, at 300° C. for 1 hour under 10 mm Hg, and then at 320° C. for 2 hours under 0.1 mm Hg, to obtain an aromatic polyester.

The liquid-crystal transition temperature and Vicat softening point A of the resulting aromatic polyester were 254° C. and 110° C., respectively.

EXAMPLE 36

Synthesis of bis(2-hydroxyethyl)terephthalate(BHET)

A 1-liter glass flask equipped with a stirrer, thermometer, gas inlet, and distillation outlet was charged with 194 g (1.00 mole) of dimethyl terephthalate, 138 g (2.24 moles) of ethylene glycol, and small amounts of calcium acetate and antimony oxide as catalysts. The mixture in the flask was purged with nitrogen, heated to 180° C., and reacted at this temperature for 3 hours. As the reaction proceeded, BHET was formed with the distillation of methanol from the flask.

Preparation of Polyester

To the reaction mixture obtained above, 21.1 g (0.05 moles) of DAQ and 8.3 g (0.05 moles) of terephthalic acid were added. The mixture was purged with nitrogen heated to 260° C., and reacted at this temperature for 30 minutes while a by-product was distilled through the distillation outlet. Then, after the distillation outlet was connected to a vacuum device, the mixture was reacted at 320° C. for 3 hours and a half under reduced pressure of 0.1 mm Hg to obtain an aromatic polyester.

The liquid-crystal transition temperature and Vicat softening point A of the resulting aromatic polyester were 224° C. and 82° C., respectively.

EXAMPLE 37

An aromatic polyester was prepared by the procedure of Example 36 except that 64 g (0.15 moles) of DHEQ instead of DAQ and 29 g (0.15 moles) of dimethyl terephthalate instead of terephthalic acid were used.

The liquid-crystal transition temperature and Vicat softening point A of the resulting aromatic polyester were 293° C. and 171° C., respectively.

EXAMPLES 38-41

An aromatic polyester was prepared by the procedure of Example 36 except that the molar ratio of the monomer components was changed as shown in Table 7.

The liquid-crystal transition temperature. Vicat softening point A, and tensile strength of the resulting aromatic polyester were measured. Table 7 shows the results of the measurements.

EXAMPLES 42-44

Synthesis of bis(4-hydroxybutyl)terephthalate (BHBT)

An autoclave equipped with a stirrer and distillation outlet was charged with 166 g (1.00 mole) of terephthalic acid, 180 g (2.00 moles) of 1,4-butanediol, and a small amount of lithium acetate as a catalyst. After the autoclave was provided with nitrogen at 3 kg/cm$^2$, the mixture was reacted at 260° C. for 3 hours to obtain BHBT.

An aromatic polyester was prepared by the procedure of Example 36 except that the molar ratio of DAEQ to the BHBT obtained above was changed as shown in Table 8.

The liquid-crystal transition temperature, Vicat softening point A, and tensile strength of the resulting aromatic polyester were measured. Table 8 shows the results of the measurements.

EXAMPLE 45

A 3-liter metallic vessel equipped with a stirrer, thermometer, gas inlet, and distillation outlet was charged with 254 g (1.00 mole) of BHET obtained in Example 36, 216.2 g (1.20 moles) of p-acetoxybenzoic acid (PAB), and 63.4 g (0.15 moles) of DHEQ. The mixture in the vessel was purged with nitrogen, heated to 260° C. at ordinary pressure, and reacted at this temperature for 1 hour while a by-product was distilled through the distillation outlet. Then, after the distillation outlet was connected to a vacuum device, the mixture was reacted at 280° C. for 1 hour at reduced pressure of 100 mm Hg, at 320° C. for 1 hour at 10 mm Hg, and then for 1 hour at 0.1 mm Hg to obtain an aromatic polyester.

The liquid-crystal transition temperature and Vicat softening point A of the resulting aromatic polyester were measured. Table 9 shows the results of the measurements.

EXAMPLES 46–48

An aromatic polyester was prepared by the procedure of Example 45 except that the molar ratio of the components was changed as shown in Table 9.

The liquid-crystal transition temperature and Vicat softening point A of the resulting aromatic polyester were measured. Table 9 shows the results of the measurements.

EXAMPLES 49–51

An aromatic polyester was prepared by the procedure of Example 45 except that BHET obtained in Example 36, p-acetoxybenzoic acid (PAB), and DAQ were used at the molar ratio shown in Table 9.

The liquid-crystal transition temperature, and Vicat softening point A of the resulting aromatic polyester were measured. Table 9 shows the results of the measurements.

TABLE 5

| | DAQ (mol) | DAEQ (mol) | TPA (mol) | PAB (mol) | ANA (mol) | Liquid-crystal transition temperature (°C.) | Vicat softening point A (°C.) |
|---|---|---|---|---|---|---|---|
| Example 19 | 0.10 | — | 0.10 | 0.40 | 0.60 | 297 | 223 |
| Example 20 | 0.15 | — | 0.15 | 0.40 | 0.60 | 310 | 236 |
| Example 21 | 0.30 | — | 0.30 | 0.40 | 0.60 | 322 | 284 |
| Example 22 | 0.10 | — | 0.10 | 0.60 | 0.40 | 308 | 234 |
| Example 23 | — | 0.30 | 0.30 | 1.35 | 1.65 | 320 | 277 |
| Example 24 | — | 0.15 | 0.15 | 0.45 | 0.55 | 294 | 218 |
| Example 25 | — | 0.20 | 0.25 | 0.45 | 0.55 | 311 | 243 |
| Example 26 | — | 0.10 | 0.10 | 0.60 | 0.40 | 315 | 280 |
| Comparative Example 9 | — | — | — | 0.40 | 0.60 | 245 | 174 |

DAQ: 4,4'''-Diacetoxy-p-quaterphenyl
DAEQ: 4,4'''-Di(2-acetoxyethoxy)-p-quaterphenyl
TPA: Terephthalic acid
PAB: p-Acetoxybenzonic acid
ANA: 2-Acetoxy-6-naphthoic acid

TABLE 6

| | DHEQ (mol) | BPA (mol) | TPM (mol) | Liquid-crystal transition temperature (°C.) | Vicat softening point A (°C.) |
|---|---|---|---|---|---|
| Example 27 | 0.10 | 0.90 | 1.00 | 281 | 191 |
| Example 28 | 0.05 | 0.95 | 1.00 | 241 | 185 |
| Example 29 | 0.15 | 0.85 | 1.00 | 287 | 204 |

DHEQ: 4,4'''-Di(2-hydroxyethoxy)-p-quaterphenyl
BPA: Bisphenol A
TPM: Dimethyl terephthalate

TABLE 7

| | DHQ (mol) | BHET (mol) | Liquid-crystal transition temperature (°C.) | Vicat softening point A (°C.) | Tensile Strength (kg/cm²) |
|---|---|---|---|---|---|
| Example 38 | 0.05 | 1.00 | 224 | 89 | 2020 |
| Example 39 | 0.10 | 1.00 | 267 | 112 | 2180 |
| Example 40 | 0.20 | 1.00 | 312 | 182 | 2210 |
| Example 41 | 0.30 | 1.00 | 320 | 228 | poor moldability |

BHET: Bis(2-hydroxyethyl)terephthalate
DHQ: 4,4'''-Dihydroxy-p-quaterphenyl

TABLE 8

| | DAEQ (mol) | BHBT (mol) | Liquid-crystal transition temperature (°C.) | Vicat softening point A (°C.) | Tensile Strength (kg/cm²) |
|---|---|---|---|---|---|
| Example 42 | 0.05 | 1.00 | 220 | 84 | 1990 |
| Example 43 | 0.10 | 1.00 | 261 | 106 | 2160 |
| Example 44 | 0.20 | 1.00 | 307 | 176 | 2200 |

DAEQ: 4,4'''-Di(2-acetoxyethoxy)-p-quaterphenyl
BHBT: Bis(4-hydroxybutyl)terephthalate

TABLE 9

| | DHEQ (mol) | DAQ (mol) | BHET (mol) | PAB (mol) | Liquid-crystal transition temperature (°C.) | Vicat softening point A (°C.) |
|---|---|---|---|---|---|---|
| Example 45 | 0.15 | — | 1.00 | 1.20 | 298 | 214 |
| Example 46 | 0.05 | — | 1.00 | 1.20 | 256 | 186 |
| Example 47 | 0.30 | — | 1.00 | 1.20 | 308 | 272 |
| Example 48 | 0.15 | — | 1.00 | 0.80 | 290 | 208 |
| Example 49 | — | 0.15 | 1.00 | 1.20 | 290 | 209 |
| Example 50 | — | 0.05 | 1.00 | 1.20 | 252 | 183 |
| Example 51 | — | 0.15 | 1.00 | 1.00 | 288 | 199 |

DHEQ: 4,4'''-Di(2-hydroxyethoxy)-p-quaterphenyl
DAQ: 4,4'''-Diacetoxy-p-quaterphenyl
BHET: Bis(2-hydroxyethyl)terephthalate
PAB: p-Acetoxybenzonic acid From the results of the measurements described above, it was seen that the polyester of the present invention is excellent in heat stability, moldability, and mechanical properties.

EXAMPLE 52

To the reaction mixture containing BHET obtained in Example 36, 50.7 g (0.15 moles) of DHQ was added. The mixture in the flask was heated to 280° C. and reacted at this temperature for about 2 hours. Then, after the distillation outlet was connected to a vacuum device, the mixture was reacted for 1 hour at reduced pressure of 1 mm Hg. As the reaction proceeded, a highly viscous liquid was formed with the distillation of ethylene glycol from the flask. The liquid (an aromatic polyester) was solidified.

A composition was obtained by mixture of 70% by weight of the resulting aromatic polyester and 30% by weight of glass fibers (10 μm in diameter and 3 mm long).

The composition was molded continuously with an injection molding machine (IS30EPN; TOSHIBA Machine Inc.) under the molding conditions of a cylinder temperature of 270° C., a nozzle temperature of 265° C., a mold temperature of 65° C., and total molding cycle of 24 seconds, resulting in a test specimen of Type I described in JIS K7113 (JIS K 7113 corresponds to ASTM D638). The test specimen obtained by the molding procedure had a smooth surface. The tensile strength of the test specimen was 1960 kg/cm$^2$. The heat deflection temperature (HDT) of the test specimen measured by the method of JIS K7207 was 258 ° C.

Comparative Example 10

Polyethylene terephthalate was prepared by the procedure of Example 52 except that DHQ was not used. A composition was obtained by mixture of the resulting polyethylene terephthalate with glass fibers as in Example 52.

Although the composition was molded by the procedure of Example 52, the resulting test sample had poor surface smoothness because of its slower rate of crystallization, and it was impossible to achieve continuous molding of the composition.

EXAMPLES 53-56 AND COMPARATIVE EXAMPLE 11

An aromatic polyester was prepared by the procedure of Example 52 except that the molar ratio of the monomer components was changed as shown in Table 10.

The readiness of crystallization of the resulting aromatic polyester was estimated from its crystallization temperature and crystallization half-value period, both of which was measured by the following procedure.

Measurement of the crystallization temperature: After the aromatic polyester obtained was dried in a vacuum drier at 110° C., it was pressed between two stainless steel boards coated with polytetrafluoroethylene under the pressure of 18 MPa and at the temperature of 280° C. for 2 minutes to obtain film 0.375 mm thick. The resulting film was cooled rapidly with ice. The film was cut into a sample weighing about 10 mg. The exothermic curve of the sample was drawn by heating it at the rate of 16° C./minute using an IB-type differential scanning calorimeter (DSC; Perkin Elmer Inc.). Then the crystallization temperature of the sample was measured by reading of the maximum temperature of the exothermic curve.

Measurement of the crystallization half-value period: The crystallization half-value period of the resulting aromatic polyester was measured by use of the IB-type differential scanning calorimeter (DSC; Perkin Elmer Inc.). After the sample film 0.375 mm thick mentioned above was melted at the temperature of 270° C. for 10 minutes, it was cooled rapidly to 200° C. The exothermic curve of the sample was drawn while the film was kept at this temperature. Then, as shown in FIG. 1, the area surrounded by the exothermic curve ranging from the zero point (where the amount of heat generated is zero) to the maximum point HM and the abscissa axis was measured. The crystallization half-value period of the sample was determined by reading of the time T at which the total amount of that generated from 0 to T becomes equal to the total amount of heat generated from T to $T_M$.

The aromatic polyester obtained by a homopolycondensation reaction of BHET (Comparative Example 11) had an exothermic peak due to its crystallization at 118° C. However, the aromatic polyesters obtained in Examples 53-56 did not have exothermic peaks, indicating that the polyesters obtained in Examples 53-56 had already crystallized when they were cooled rapidly with ice.

The crystallization half-value period of the aromatic polyester obtained in Comparative Example 11 was 400 seconds. The crystallization half-value period of the aromatic polyesters obtained in Examples 53-56 were the short periods shown in Table 10. In particular, the crystallization half-value period of the aromatic polyesters of Examples 54 and 55 was too short to measure. That is, the peak of the exothermic curve of these aromatic polyesters did not appear because the polyesters had already crystallized when they were cooled to 200° C.

TABLE 10

|  | DHQ (mol) | DHEQ (mol) | BHET (mol) | Crystallization temperature (°C.) | Crystallization half-value period (sec) |
| --- | --- | --- | --- | --- | --- |
| Example 53 | — | 0.05 | 1.00 | — | 10 |
| Example 54 | — | 0.10 | 1.00 | — | — |
| Example 55 | — | 0.20 | 1.00 | — | — |
| Example 56 | 0.10 | — | 1.00 | — | 6 |
| Comparative Example 11 | — | — | 1.00 | 118 | 400 |

DHQ: 4,4'''-Dihydroxy-p-quaterphenyl
DHEQ: 4,4'''-Di(2-hydroxyethoxy)-p-quaterphenyl
BHET: Bis(2-hydroxyethyl)terephthalate

What is claimed is:

1. A polyester produced from main acid moiety contributing monomer components comprising at least one dicarboxylic acid, or at least one lower alkyl ester of a dicarboxylic acid, or at least one halogenated dicarboxylic acid; and as its main alcoholic moiety contributing monomer components at least a p-quater-phenyl derivative of the formula:

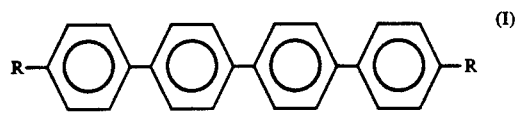

(I)

wherein the R groups, independently, are

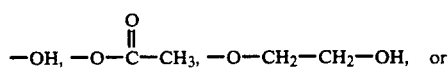

-continued

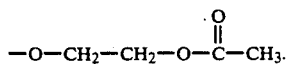

2. A polyester according to claim 1, wherein said p-quaterphenyl derivative is 4,4'''-dihydroxy-p-quaterphenyl.

3. A polyester according to claim wherein said dicarboxylic acid is an aliphatic dicarboxylic acid.

4. A polyester according to claim 3, wherein said aliphatic dicarboxylic acid is of the formula:

$$\text{HOOC—(CH}_2)_n\text{—COOH} \qquad [\text{II}]$$

wherein n is an integer from 0 to 10.

5. A polyester according to claim 4, wherein said aliphatic dicarboxylic acid is at least one selected from the group consisting of oxalic acid, malonic acid, succinic acid, glutaric acid, adipic acid, suberic acid, and sebacic acid.

6. A polyester according to claim 3, wherein said diol comprises a non-aromatic diol in combination with said p-quaterphenyl derivative.

7. A polyester according to claim 6, wherein said p-quaterphenyl derivative is present in an amount of 0.1 to 30 mol % based on the total moles of monomer components of the polyester.

8. A polyester according to claim 6, wherein said nonaromatic diol is at least one selected from the group consisting of a glycol, a polyalkylene oxide, and a polysilicone having two hydroxyl groups.

9. A polyester according to claim 8, wherein said glycol is at least one selected from the group consisting of ethylene glycol, propylene glycol, trimethylene glycol, 1,4-butanediol, 1,3-butanediol, 1,5-pentanediol, 1,6-hexanediol, 1,7-heptanediol, 1,8-octanediol, 1,9-nonanediol, 1,10-decanediol, 1,2-cyclopentanediol, 1-2-cyclohexanediol, 1,3-cyclohexanediol, and 1,4 cyclohexanediol and 1,4-cyclohexanedimethanol.

10. A polyester according to claim 8, wherein said polyalkylene oxide is at least one selected from the group consisting of polyethylene oxide, polypropylene oxide, polytetramethylene oxide, and polyhexamethylene oxide, each of which has a number average molecular weight of 100 to 20,000.

11. A polyester according to claim 1, wherein said dicarboxylic acid is an aromatic dicarboxylic acid.

12. A polyester according to claim 11, wherein said aromatic dicarboxylic acid is at least one selected from the group consisting of terephthalic acid, isophthalic acid, metal salts of 5-sulfoisophthalic acid, 4,4'-biphenyldicarboxylic acid, 4,4'-dicarboxydiphenyl ether, 4,4'-dicarboxydiphenyl sulfide, 4,4'-dicarboxydiphenyl sulfone, 3,3'-benzophenonedicarboxylic acid, 4,4'-benzophenonedicarboxylic acid, 1,2-bis(4-carboxyphenoxy)ethane, 1,4-naphthalenedicarboxylic acid and 2,6-naphthalenedicarboxylic acid.

13. A polyester according to claim 11, wherein said diol comprises an aromatic diol, other than said p-quaterphenyl derivative, in combination with said p-quaterphenyl derivative.

14. A polyester according to claim 11, wherein said diol comprises a non-aromatic diol in combination with said p-quaterphenyl derivative.

15. A polyester according to claim 14, wherein said p-quaterphenyl derivative is present in an amount of from 0.1 to 20 mol % based on the total moles of monomer components of the polyester.

16. A polyester according to claim 14, wherein said nonaromatic diol is at least one selected from the group consisting of a glycol, a polyalkylene oxide, and a polysilicone that has two hydroxyl groups.

17. A polyester according to claim 16, wherein said glycol is at least one selected from the group consisting of ethylene glycol, propylene glycol, trimethylene glycol, 1,4-butanediol, 1,3-butanediol, 1.5-pentanediol, 1,6-hexanediol, 1,7-heptanediol, 1,8-octanediol, 1,9-nonanediol, 1,10-decanediol, 1,2-cyclopentanediol, 1,2-cyclohexanediol, 1,3-cyclohexanediol, 1,4,-cyclohexanediol, and 1,4-cyclohexanedimethanol.

18. A polyester according to claim 16, wherein said polyalkylene oxide is at least one selected from the group consisting of polyethylene oxide, polypropylene oxide, polytetramethylene oxide, and polyhexamethylene oxide, each of which has a number average molecular weight of 100 to 20,000.

19. A thermoplastic elastomer comprising a polyester of claim 3.

20. An elastic article comprising a thermoplastic elastomer of claim 19.

21. A liquid-crystal polymer comprising a polyester of claim 11.

22. A rigid article comprising a liquid-crystal polymer of claim 21.

23. A polyester polymer produced from main monomer components comprising:
   (1) a dicarboxylic acid; and
   (2) at least one diol comprising a p-quater-phenyl derivative having the formula:

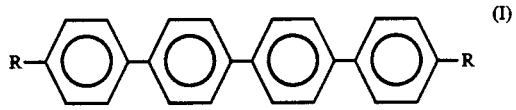

wherein the R groups, independently, are,

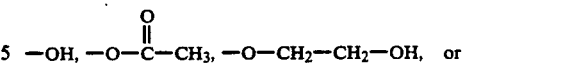

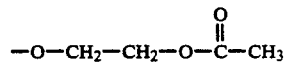

* * * * *

UNITED STATES PATENT AND TRADEMARK OFFICE
CERTIFICATE OF CORRECTION

PATENT NO. : 5,191,057
DATED : March 2, 1993
INVENTOR(S) : Akihiro NIKI, Makoto OHSUGA, Toshio UESAKA, Toranosuke SAITO, Hiroki TSUNOMACHI, Kazuo DOYAMA, Makoto Yamaguchi, Daishiro KISHIMOTO It is certified that error appears in the above-indentified patent and that said Letters Patent is hereby corrected as shown below:

On the title page, item [30], the number of the last listed prior foreign application should be changed from "1-15845" to --1-15745--.

Signed and Sealed this

Fourth Day of January, 1994

Attest:

BRUCE LEHMAN

*Attesting Officer*    *Commissioner of Patents and Trademarks*